(No Model.)
G. W. GARDANIER.
DUPLEX TELEGRAPHY.
No. 361,356. Patented Apr. 19, 1887.
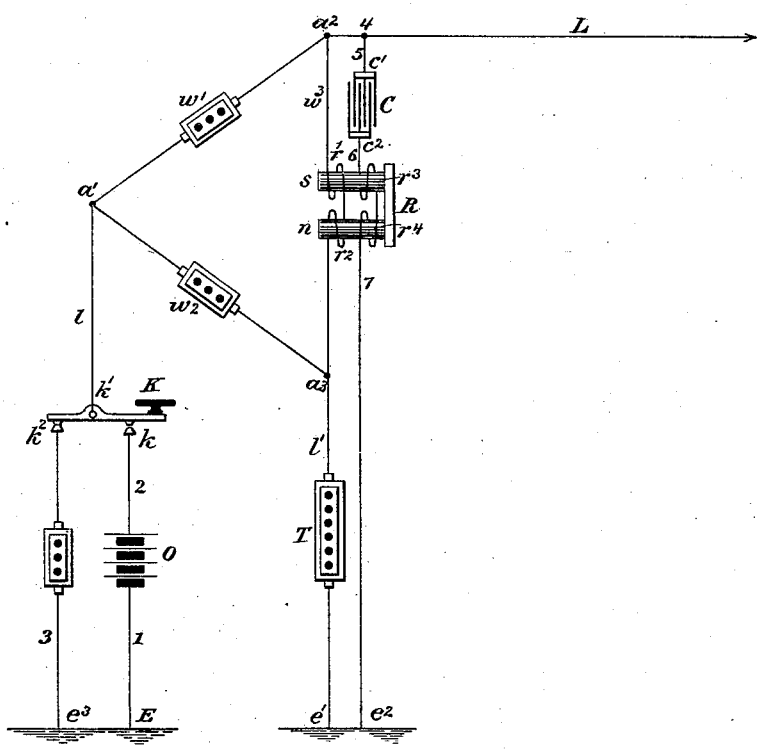
Witnesses
Geo. W. Breck
Ulysses W. Cook
Inventor
George W. Gardanier
By his Attorneys
Pope & Edgecomb

UNITED STATES PATENT OFFICE.

GEORGE W. GARDANIER, OF NEW YORK, N. Y., ASSIGNOR TO THE BALTIMORE AND OHIO TELEGRAPH COMPANY, OF BALTIMORE, MARYLAND.

DUPLEX TELEGRAPHY.

SPECIFICATION forming part of Letters Patent No. 361,356, dated April 19, 1887.

Application filed September 23, 1885. Serial No. 177,888. (No model.)

*To all whom it may concern:*

Be it known that I, GEORGE W. GARDANIER, a citizen of the United States, residing in the city of New York, in the county and State of New York, have invented certain new and useful Improvements in Duplex Telegraphy, of which the following is a specification.

The invention relates to the organization of circuits and apparatus for preventing the false signals which are liable to be produced upon the receiving-instruments at the home stations of duplex and quadruplex telegraphs by reason of the momentary currents due to the static induction of the main line.

The invention consists in combining, with a transmitting apparatus adapted to send currents from a suitable source to the main line and a receiving-instrument included in a Wheatstone bridge, a condenser interposed in a conductor leading from the main-line circuit to the earth at the home station through a second set of coils wound upon the cores of the receiving-instrument. The discharge of the condenser, upon the interruption of the battery-circuit, causes an impulse to traverse the second or supplemental set of coils upon the receiving-instrument. This impulse tends to neutralize the effect of the discharge of the main line which takes place across the bridge-conductor of the Wheatstone bridge. The discharge from the condenser to the main line also tends to neutralize the line-discharge by passing from the plate to the line and there meeting and opposing it.

The accompanying drawing is a diagram showing an organization of the circuits and apparatus at one station.

Referring to the drawing, L represents the main line over which it is designed to transmit currents from the battery O by means of a key, K. The battery has one pole connected with the earth at E by a conductor, 1, and its other pole is connected by conductor 2 with the front stop, $k$, of the key K. The back-stop $k^2$ of this key is connected with the earth at $e^3$ by a conductor, 3. The lever $k'$ of the key is connected by a portion, $l$, of the main line with the meeting-point $a'$ of the two arms $w'$ $w^2$ of a Wheatstone bridge. The arm $w^2$ is connected at a point, $a^3$, with an artificial line, $l'$, which leads through an artificial resistance, T, to the earth at $e'$. The bridge-conductor $w^3$ leads from the point $a^2$ to the point $a^3$ through the coils $r'$ and $r^2$ of a receiving-instrument, R. It is evident that the outgoing currents will divide at the point $a'$, a portion going over the main line and a portion to the earth at $e'$ by way of the bridge $w^2$ and the artificial line $l'$. No effect, therefore, will be produced upon the receiving-instrument R. The incoming currents, however, arriving at the point $a^2$, may find their way to the earth either through the bridge-wire $w^3$ and the artificial line $l'$ or by way of the arm $w'$, line $l$, and key K. If the latter is at rest against its back-stop $k^2$, then the circuit will be completed from the line $l$, by the conductor 3, to the earth at $e^3$; otherwise through the conductor 2 and battery O and conductor 1 to the earth at E.

Leading from a point, 4, in the line L is a conductor, 5, connected with one side, $c'$, of a condenser, C. The other side, $c^2$, of the condenser is connected by a conductor, 6, through the supplemental coils $r^3$ and $r^4$, upon the cores of the receiving-instrument R, and from these coils the connections are completed, by the conductor 7, with the earth at $e^2$.

When the circuit of the battery O is completed with the main line by the key K, the condenser C receives upon its plate $c'$ a positive charge and upon the plate $c^2$ a negative charge, considering that the positive pole is to line. Upon the interruption of the circuit there is a tendency for the line L to discharge through the coils $r'$ and $r^2$, sending a positive impulse from the point $a^2$ to the point $a^3$. The effect produced by the discharge of the condenser C is to neutralize the effect of the discharge of the line. The charge taken by the plate $c^2$ will be negative, or the opposite of that received by the line, and therefore the coils $r^3$ and $r^4$ must be so wound that the impulse from the condenser-plate $c'$ will circulate in the opposite direction from the current from the line. In this manner the effect of the discharge of the condenser will be to neutralize the magnetism which would otherwise be produced in the cores of the instrument R by the discharge-current traversing the coils $r'$ and $r^2$.

I claim as my invention—

1. The combination, substantially as hereinbefore set forth, of a main line, a Wheatstone bridge, a receiving-instrument in the bridge, supplemental coils upon the receiving-instrument, and a condenser having one plate connected with the main line and the other plate connected, through said supplemental coils, with the earth.

2. The combination of a main line, a battery, a Wheatstone bridge, means for connecting said battery with the arms of said bridge, a receiving-instrument included in the bridge-conductor, an artificial line connecting the bridge-wire with the earth, a condenser, conductors connecting the respective plates of the same with the battery and the earth, and compensating coils applied to the receiving-instrument included in said conductors.

In testimony whereof I have hereunto subscribed my name this 8th day of September, A. D. 1885.

GEORGE W. GARDANIER.

Witnesses:
JAMES H. ELLIS,
FRANK A. PIERSON.